May 19, 1953 C. F. BALL 2,639,102
REELING MECHANISM FOR POWER CONDUCTORS
Filed Feb. 26, 1947 2 Sheets-Sheet 1

Inventor:
Charles F. Ball.
by
Attorney.

Inventor:
Charles F. Ball.
by
Attorney.

Patented May 19, 1953

2,639,102

UNITED STATES PATENT OFFICE 2,639,102

REELING MECHANISM FOR POWER CONDUCTORS

Charles F. Ball, Franklin, Pa., assignor to Joy Manufacturing Company, a corporation of Pennsylvania Application February 26, 1947, Serial No. 731,123

25 Claims. (Cl. 242—90)

My invention relates to reeling apparatus for self-propelled vehicles, and more particularly to reeling apparatus for mine locomotives or "shuttle cars" where the power supply conductor or cable must at one moment be wound in to prevent its being run over and damaged by the vehicle and at another moment be payed out as the vehicle moves away from the point where the cable is attached to a source of current.

In the operation of mine locomotives and "shuttle cars," it is common to supply power to the propulsion motors by means of a cable wound on a reel mounted on the vehicle, but having a free end adapted to be connected to the track and trolley line or to a gate end box, or to some other point at which current is available. As the vehicle moves away rectilinearly from the point of attachment, the cable must be payed out, and as it moves back towards the point of connection the cable must be wound up to prevent its being run over. Moreover, when the vehicle is moving back and forth in opposite directions past the mouth of a passageway down which the cable extends to a point of connection, the cable must be payed out as the vehicle moves in one direction away from the mouth of the passageway, rewound as the vehicle returns to the mouth of the passageway, again payed out when the vehicle moves in the opposite direction away from the mouth of the passageway, and again wound in on its return. A similar situation would exist when the connection to the source of power is closely adjacent to but between the ends of the work path of the vehicle. Electrically driven reels have been employed for the purpose of controlling the winding in and the paying out of the cable, and resistance has been introduced into the reel driving motor circuit when the cable is to be payed out, in order that the torque may be decreased. With such arrangements, however, having to have current continuously on the reel driving motor has been undesirable, and I have provided, in my present invention, an arrangement in which a hydraulic drive of a reel may be effected by a motor-pump device; and in order to save power, and to prevent the heating of the oil, and to protect the cable against excessive wear, I have made provision to reduce the back pressure against which the motor-pump device which drives in its capacity as a motor, the reel during winding in, has to discharge, when serving as a pump driven by the reel, as the cable is pulled off of the latter.

In a preferred apparatus in which the reel is hydraulically driven, a motor-pump device connected to a reel to drive the latter in a winding in direction, and to be driven by the latter when cable is being unwound from the reel, a pump for supplying operating fluid to the motor-pump device, and a plurality of differently set relief valves are provided, with arrangements so that when the motor-pump device is being operated as a motor, fluid pressure may be returned to the tank only after opening a pressure relief valve having a relatively high setting, while, when the motor-pump device is being driven as a pump by the reel, a pressure relief valve having a considerably lower setting is operative to permit the fluid pumped by the main pump and also that pumped by the motor-pump device to be returned to a tank. According to a preferred arrangement, a passage between the second mentioned relief valve and a return line to the tank may be provided with controlling means for opening or shutting off the same, and a device adapted to be operated when the reel is turning is arranged to move said controlling means to effect opening of said passage when the reel is turning one direction, and this device, when the reel is turning in the opposite direction, is adapted to effect shutting off of said passage, and such device is so constructed and arranged that it requires the exertion of relatively low forces. In the preferred embodiment mentioned, such a device may include a friction clutch driven actuating means for said passage opening and shutting off controlling means; and desirably, such friction clutch device may be actuated from the operating shaft of the motor-pump device; although it may be operated by any element which is in motion whenever the reel is turning. With such an arrangement, motion of the reel will insure the proper functioning of the system, will bring about such proper functioning immediately upon the initiation of reel movement, will involve a minimum cable wear and tear, loss of power, and creation of heat, and will provide complete safety against the danger of failing to commence to wind in the cable quickly enough when the vehicle commences to move toward the point of cable attachment.

In the accompanying drawings, in which one embodiment which my invention may assume in practice is shown, for purposes of illustration, Fig. 1 is a diagrammatic view of a system of the character described;

Fig. 5 is shown enlarged.

Figure 1:
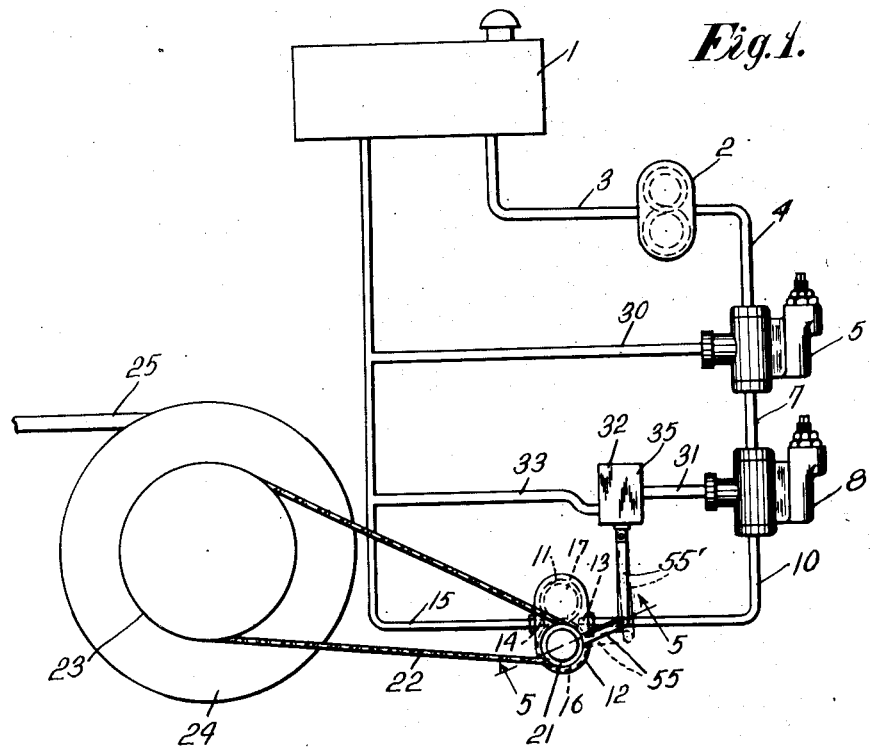

Referring to the drawings, it will be observed that a tank 1 constitutes a reservoir for a hydraulic fluid. A pump 2, herein shown diagrammatically as a gear pump, is connected by a suction line 3 to the tank 1. The discharge line 4 of the pump 2 is connected to a high pressure relief valve 5 through the internal chamber 6 of which it may pass freely to a conduit 7 which leads to a low pressure relief valve 8, through the interior chamber 9 of which the fluid may pass freely to another conduit 10, which leads to the rotor chamber 11 of a motor-pump device 12. This motor-pump device is also shown as of the intermeshing gear type, and has at the opposite sides of the mesh line of the gears, a connection 13 to which the conduit 10 leads and a connection 14 which is connected by a line 15 back to the tank 1. It will be observed that, depending upon the direction of rotation of the gears of the motor-pump device 12, fluid will either be transmitted from the conduit 10 to the line 15 or vice versa. The motor-pump device 12 has its intermeshing gears respectively designated 16 and 17, and these may be journaled in any suitable manner, as the structure of this motor-pump device is quite conventional. Herein it will be noted that the rotor 16 is mounted on a shaft 18 to which there is keyed, as at 19, and held, as at 20, by a set screw, a sprocket 21 connected by a suitable chain 22 to a larger sprocket 23 on a reel 24, with which there is associated the conductor or cable 25 for supplying power to the vehicle which supports the apparatus so far described. The free end of the cable is adapted to be connected, by means not shown, to suitable trolley wires, to a track and a trolley wire, or to some other source of electrical energy; and well known means is provided for delivering power supplied to the conductor or cable 25 to a driving motor or to driving motors (not shown) for the vehicle. It will be understood that with the cable 25 wound on the reel 24 in the direction shown, the reel will be driven in a winding-in direction (clockwise in Fig. 1) when fluid from the pump 2 is supplied under adequate pressure to the motor-pump device 12 and winding in is possible, and that the motor-pump device 12 will be driven, in a direction to pump fluid supplied to it through the conduit 15, into the conduit 10, when the cable 25 causes the reel 24 to rotate in a counter-clockwise direction as the vehicle moves away from the point of connection of the cable 25.

Obviously the pump 2 and the motor-pump device 12 need not be of the intermeshing gear type but may be of any suitable type or types. The pump 2 may be driven in any suitable manner continuously while reel operation or control are desired.

Figure 2:
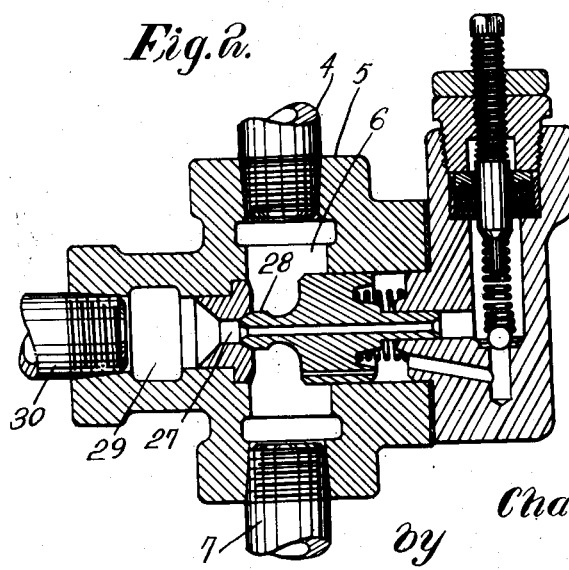
Fig. 2 is a section through a high pressure relief valve forming a part of said system.
Figure 3:
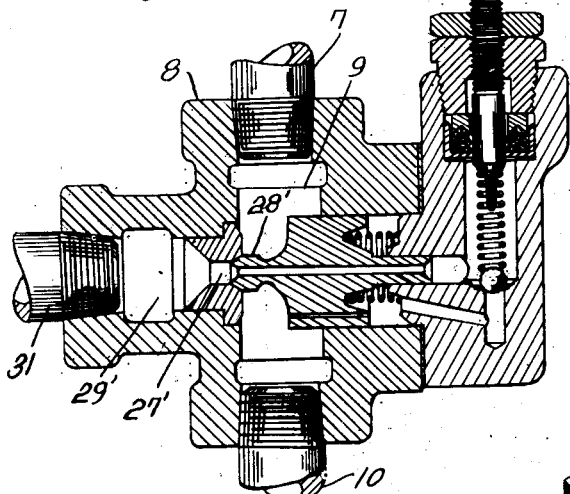
Fig. 3 is a section through a low pressure relief valve forming a part of the system.

The valve mechanisms 5 and 8 are of similar construction, and each is shown as of a well known commercial construction; and they may differ from each other primarily in that the valve mechanism 5 is adapted to relieve pressure therefrom at a relatively high pressure, say, on the order of 300 to 400 pounds per square inch, while the valve mechanism 8 is adapted to relieve pressure therefrom at a pressure of the fluid in its chamber 9 of 100 to 150 p. s. i. Referring first momentarily to the device 5, it will be observed that a passage 27 is adapted, on movement of a valve 28 to open position (to the right in Fig. 2) to connect the chamber 6 with a chamber 29, which a conduit 30 connects to the line 15. In the case of the low pressure relief valve 8, a passage 27' is adapted to connect a chamber 29' with a conduit 31 leading to a valve mechanism 32, shortly to be described, and another conduit 33 connects the valve mechanism 32 to the line 15. When the valve 28' of the valve mechanism 8 moves to open position fluid may pass from the chamber 9 through the opening 27', the chamber 29', to the conduit 31, and may have access to the conduit 33 or not, depending upon the control exerted by the mechanism 32. The mechanism 32 is shown in section in Fig. 4, and will be observed to comprise a casing 35 having a bore 36 in which a piston valve 37 is reciprocable. The piston valve 37 has a peripheral groove 38 which, in the position of the piston valve 37 shown in Fig. 4 (the upper position of said valve), operates to connect a lower annular groove 40 with an upper annular groove 39. The groove 39 is connected with the conduit 31; the groove 40 with the conduit 33.

Figure 4:
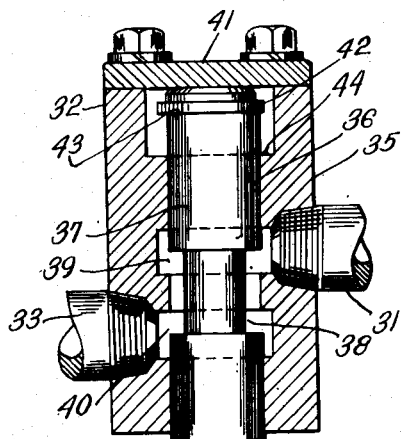
Fig. 4 is a section through a valve shiftable to bring the low pressure relief valve into operative relation to the system.

Means is provided for controlling the position of the piston valve 37 so that said valve will be in the raised position shown in Fig. 4 and establish communication between the conduits 31 and 33 when the reel 24 is turning counterclockwise in Fig. 1, that is to say, is being caused to turn by the tension which the cable exerts upon it in an unwinding direction as the vehicle moves in such a direction as to require lengthening of the cable between the point of connection of its end and the reel. Conversely, when the reel 24 is being driven by the motor-pump device 12 and is winding in cable, the piston valve 37 will be moved downwardly from the position shown in Fig. 4 and interrupt communication between the grooves 39 and 40 and correspondingly between the conduits 31 and 33. When the piston valve is in its raised position of Fig. 4, it will be possible for fluid pumped to be vented to the return line 15 when the pressure in the conduit 10 exceeds the setting of the low pressure relief valve device 8, and when the piston valve 37 is in its lowered position, relief of pressure from the conduit 10 to the return conduit 15 by opening of the low pressure relief valve 8 will be an impossibility because the conduit 31 will be closed.

It will be noted that the piston valve 37 will be stopped in its upward movement by the engagement of its upper end with a cover 41 of the casing 35, and downward movement of the piston valve 37 will be interrupted when the piston valve is in its position cutting off communication between the chambers 39 and 40, as by a split ring 42 received in a groove 43 in the upper end of the upper spool of the piston valve, which ring is engageable with a surface 44 extending transversely of the casing 35.

Figure 5:
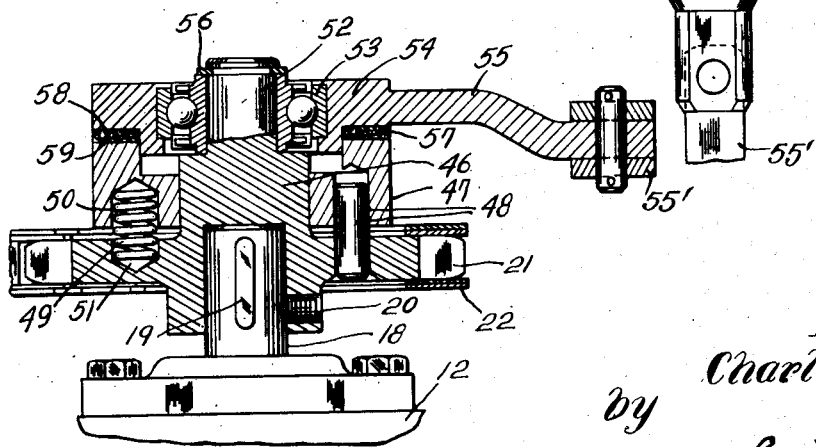
Fig. 5 is a sectional view on the plane of the line 5—5 of Fig. 1, showing a controlling device for the valve of Fig. 4.

The position of the piston valve 37 is controlled by a frictional control arm mechanism, shown most clearly in Fig. 5. In this figure, it will be observed that the sprocket 21 has extending from it a boss 46 on which there is mounted a collar or sleeve member 47 which is held by a pin and hole connection 48 against rotation relative to the sprocket, but which is permitted by this form of connection some axial movement with respect to the sprocket and which is thrust outwardly relative to the boss 46 by springs 49 shown as arranged in recesses 50, 51 formed in the sleeve and sprocket members, respectively. The boss 46 has a reduced outer end 52, and an anti-friction bearing 53 rotatably supports a support ring 54 of a lever arm 55 on this reduced outer end 52. The lever arm 55 is connected by a link 55' with the valve 37. A split ring and groove arrangement 56 holds the bearing 53 against displacement endwise from the end 52 of the boss 46. A ring 57 of suitable friction material is received between the parallel surfaces 58 on the support ring 54, and 59 on the sleeve 47. This slip friction connection between the sprocket and the arm 55 is, of course, simply illustrative of friction or even other drives which will exert on the lever 55 a predetermined torque when the sprocket turns in either direction, as long as it is so turned and until, indeed, the sprocket commences to turn in the other direction. Specifically, this arrangement will, when fluid is supplied by the pump 2 to the motor-pump device 12 and the reel 24 is driven by the motor-pump device clockwise in Fig. 1 to effect winding in of the conductor 25, cause the lever arm 55 to be moved into the dotted line position shown in Fig. 1, and thus will cause movement of the piston valve 37 to its lower position and cut off communication between the conduits 31 and 33. As a result, it will be impossible for the relief valve 8 having the lower setting to predetermine the maximum pressure in the line 10, and no escape of fluid to the return line 15 will be possible at a pressure below the setting of the high pressure relief valve 5. Accordingly, the motor-pump device when operating as a motor will exert a torque on the reel adequate to effect winding in of the cable at the necessary rate whenever cable winding is possible.

When the reel is rotated counter-clockwise in Fig. 1, as will occur when the vehicle moves away from the point of attachment of the cable 25, the motor-pump device 12 will be driven by the reel and will operate as a pump, and, taking in fluid through the conduit 16, will force it into the line 10. Because the arm 55 will be moved immediately from the dotted line position shown in Fig. 1 to the full line position shown in that figure as soon as the shaft 18 of the motor-pump device is turned counter-clockwise, the piston valve 37 will be moved to the position shown in Fig. 4 and a connection will be established between the conduits 31 and 33, and thereafter, so long as cable is being drawn off of the reel, pressure will be relieved from the conduit 10 as soon as the pressure equals the setting of the low pressure relief valve 8. Accordingly, during the drawing off of cable from the reel the tension to which the cable is subjected will be reduced and heating of the oil will be reduced also.

Since the static friction in the mechanism shown in Fig. 5 will exceed the friction in this mechanism when the parts are relatively rotating, it will be evident that whenever the reel comes to a stop, regardless of the direction in which it has been previously turning, there will be nothing to effect a change in the position of the piston valve 37 at the time motion ceases, until motion in an opposite direction of the reel occurs. Thus, when the reel ceases to rotate at the end of a period of winding in, the cable 25 will remain under the higher tension so long as the reel remains stationary; and if the reel ceases to rotate after a period of rotation in an unwinding direction, the tension of the cable will remain the relatively low one which prevails during drawing off of the cable. One important point must not, however, be overlooked, and that is that the setting of the low pressure relief valve will be such that fluid under a pressure less than the setting of the low pressure relief valve will be operative to set the reel in motion in a winding in direction as soon as any slack is introduced in the cable, and of course the very instant that the reel begins to turn in a winding in direction the arm 55 and the piston valve 37 are shifted to cut off the communication between the conduits 31 and 33 and to throw the control of the pressure in the line 10 immediately back to the high pressure relief valve so that the pressure in this conduit 10 will instantaneously build up to the higher value desirable for reeling in operation.

It will further be noted that the mechanism is a balanced piston valve mechanism, and that by suitably packing the upper spool of the valve 37 or by venting the space in which the top of valve 37 moves, or by both, or in any other suitable conventional manner there will be prevented the building up of a downwardly acting unbalanced liquid pressure on the valve 37 which will render the forces frictionally transmitted to the lever 55 incapable of moving the valve 37 upwards and holding it in the position of Fig. 4. In other words, the arrangement is such as to prevent the exertion of fluid pressure of any consequence in the matter of affecting valve actuation.

It will be observed that I have provided a very simple mechanism; one in which there is a reduction in the amount of heating of the oil; one in which, when the greater torque desirable for winding in operation is called for, it will be immediately produced; but one in which the torque exerted by the motor-pump device on the reel will be immediately reduced upon the commencement of drawing off of cable from the reel.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In combination, a winding reel adapted to have a power conductor wound thereon and to wind in the conductor or to have the conductor drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure, means for precluding release at said relatively lower pressure while the motor-pump device is operating as a motor, and means including an element rotated with said motor-pump device for controlling said release precluding means.

2. In combination, a winding reel adapted to have a power conductor wound thereon and to wind in the conductor or to have the conductor drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure, means for precluding release at said relatively lower pressure while the motor-pump device is operating as a motor, and means including an operating element, an element rotated with said motor-pump device and a frictional connection between said elements, for controlling said release precluding means.

3. In combination, a winding reel adapted to have a power conductor wound thereon and to wind in the conductor or to have the conductor drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure, and means for precluding release at said relatively lower pressure while the motor-pump device is operating as a motor and for permitting such release when the motor-pump device is rotated by said reel, including a drag actuated operating device having its drag providing element connected to turn with said reel.

4. In combination, a winding reel adapted to have a power conductor wound thereon and to wind in the conductor or to have the conductor drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure, and means for determining whether release shall occur at said relatively high pressure or at said relatively lower pressure operatively connected to said reel and having between the same and said reel a slip friction clutch.

5. In combination, a winding reel adapted to have a power conductor wound thereon and to wind in the conductor or to have the conductor drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure, valve means for precluding release at said relatively lower pressure while the motor-pump device is operating as a motor, said valve means having a slip friction controlled operating lever, and means for operatively connecting said lever to move in opposite directions as said reel turns in opposite directions.

6. In combination, a winding reel adapted to have a power conductor wound thereon and to wind in the conductor or to have the conductor drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure, and means for precluding release at said relatively lower pressure while the motor-pump device is operating as a motor including a valve shiftable to predetermine the minimum pressure at which relief occurs and means for yieldingly exerting on said valve oppositely directed forces during opposite directions of reel rotation.

7. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir at a relatively high pressure and at a relatively lower pressure, and means for precluding release at the relatively lower pressure while the motor-pump device is operating as a motor including a control element, and means for moving the same to a position to preclude release at the relatively lower pressure when said reel is rotating in a winding in direction including means for providing a drag and transmitting it to said element at least when said reel is rotating in its winding in direction.

8. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure each including a yielding loaded relief valve, and means for precluding release at the relatively lower pressure through the second mentioned fluid releasing means while the motor-pump device is operating as a motor and for rendering said second mentioned fluid releasing means operative when said motor-pump device is operated as a pump including a control element, and means for moving the same including means for providing a control element-actuating drag and for transmitting it to said element when said reel is rotating in a winding in direction.

9. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir at a relatively high pressure and at a relatively lower pressure, and means for precluding release at the relatively lower pressure while the motor-pump device is operating as a motor including a control element, and means for moving the same in at least one direction including means for providing a drag and transmitting it to said control element when said reel is rotating.

10. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure including a yieldably loaded relief valve, and means for precluding release through the yieldably loaded relief valve of said second mentioned fluid releasing means while the motor-pump device is operating as a motor and for rendering said second mentioned fluid releasing means operative to release fluid via its yieldably loaded relief valve when said motor-pump device is operated as a pump.

11. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure each including a yieldably loaded relief valve individual thereto and having its own relief line, and means for precluding release through the second mentioned fluid releasing means while the motor-pump device is operating as a motor and for rendering said second mentioned fluid releasing means operative when said motor-pump device is operated as a pump including a control valve in the relief line from the relief valve for releasing fluid at the relatively lower pressure.

12. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure each including a yieldably loaded relief valve individual thereto and having its own relief line, and means for precluding release through the second mentioned fluid releasing means while the motor-pump device is operating as a motor including a valve in the relief line associated with said second mentioned fluid releasing means.

13. In combination, a cable winding reel, a motor for driving said reel to wind in cable and driven backwards by said reel when cable is pulled off of the latter, power supply means for said motor, and means for increasing the torque exerted by said motor when driving said reel in a winding direction and for reducing the torque exerted by said motor when it is driven backwards including an element movable to different predetermined positions to effect such changes in torque and means having a slip friction connection with said motor for moving said element to such different predetermined positions as said motor turns in opposite directions.

14. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir at a relatively high pressure and at a relatively lower pressure, and means governed by the direction of reel rotation and including a slip friction clutch having a driving element rotated with said reel and a driven element, and means moved by said driven element for determining the minimum pressure at which release shall occur.

15. In a cable reeling mechanism adapted to supply power to a moving vehicle, a winding drum adapted to have a cable wound thereon, a fluid motor for driving said drum in a direction to wind cable thereon, a fluid pump, a pressure line connecting said pump to said motor and having relief means associated therewith for relieving pressure therefrom to preclude excessive tension on the cable during winding in, said motor being driven by said winding drum as a pump during the unwinding operation and exerting a torque to maintain tension on said cable during unwinding, and means for relieving pressure from said motor when driven as a pump, but permitting said pump to maintain a back pressure on said motor sufficient to maintain tension on said cable during the unwinding operation, including relief means responsive to the discharge pressure of said motor when said motor is acting as a pump for relieving pressure at a substantially lower value than is requisite to operate said first mentioned relief means while yet maintaining a predetermined back pressure on said motor and means for subjecting said relief means in an opening direction to the fluid discharged by said motor when said motor is acting as a pump.

16. In a cable reeling mechanism adapted to supply power to a moving vehicle, a winding drum adapted to have a cable wound thereon, a fluid motor for driving said drum in a direction to wind cable thereon, a fluid pump, a pressure line connecting said pump to said motor and having relief means associated therewith for relieving pressure therefrom to preclude excessive tension on the cable during winding in, said motor being driven by said winding drum as a pump during the unwinding operation and exerting a torque to maintain tension on said cable during unwinding, and means for relieving pressure from said motor when driven as a pump, but permitting said pump to maintain a back pressure on said motor sufficient to maintain tension on said cable during the unwinding operation and to initiate resumption of winding when cable tension is reduced by vehicle movement, including relief means responsive to the pressure of the discharge of said motor when said motor is acting as a pump for relieving pressure at a substantially lower value than is requisite to operate said first mentioned relief means while yet maintaining a predetermined back pressure on said motor, and means for subjecting said relief means in an opening direction to the fluid discharged by said motor when said motor is acting as a pump, and means for preventing relief by said second mentioned relief valve means during cable winding.

17. In a cable reeling mechanism adapted to supply power to a moving vehicle, a winding drum adapted to have a cable wound thereon, a fluid motor for driving said drum in a direction to wind cable thereon, a fluid pump, a pressure line connecting said pump to said motor, and having relief means associated therewith for relieving pressure therefrom to preclude excessive tension on the cable during winding in, said motor being driven by said winding drum as a pump during the unwinding operation and exerting a torque to maintain tension on said cable during unwinding, and means for relieving pressure from said motor when driven as a pump, but permitting said pump to maintain a back pressure on said motor sufficient to maintain tension on said cable during the unwinding operation and to initiate resumption of winding when cable tension is reduced by vehicle movement, including relief means for relieving pressure at a substantially lower value than is requisite to operate said first mentioned relief means, and means for preventing relief by said second mentioned relief valve means during cable winding including a device for blocking relief thereby and a control for said device governed by the direction of reel rotation.

18. In a cable reeling mechanism adapted to supply power to a moving vehicle, a winding drum adapted to have a cable wound thereon, a fluid motor for driving said drum in a direction to wind cable thereon, a fluid pump, a pressure line connecting said pump to said motor and having relief means associated therewith for relieving pressure therefrom to preclude excessive tension on the cable during winding in, said motor being driven by said winding drum as a pump during the unwinding operation and exerting a torque to maintain tension on said cable during unwinding, and means for relieving pressure from said motor when driven as a pump, but permitting said pump to maintain a back pressure on said motor sufficient to maintain tension on said cable during the unwinding operation and to initiate resumption of winding when cable tension is reduced by vehicle movement, including relief means for relieving pressure at a substantially lower value than is requisite to operate said first mentioned relief means, and means for preventing relief by said second mentioned relief valve means during cable winding including a device for blocking relief thereby and a control for said device governed by the direction of reel rotation and having a slip friction connection between the same and said reel.

19. In a cable reeling mechanism adapted to supply power to a moving vehicle, a winding drum adapted to have a cable wound thereon, a fluid motor for driving said drum in a direction to wind cable thereon, a fluid pump, a pressure line connecting said pump to said motor and having relief means associated therewith for relieving pressure therefrom to preclude excessive tension on the cable during winding in, said motor being driven by said winding drum as a pump during the unwinding operation and exerting a torque to maintain tension on said cable during unwinding and when unwinding ceases, and means for relieving pressure from said motor when driven as a pump, but permitting said pump to maintain a back pressure on said motor sufficient to maintain tension on said cable during the unwinding operation, including yieldingly loaded relief means responsive to the pressure of the fluid which it releases for relieving pressure at a predetermined, substantially lower value than is requisite to operate said first mentioned relief means and means for subjecting said relief means in an opening direction to the fluid discharged by said motor when said motor is acting as a pump.

20. In a cable reeling mechanism adapted to supply power to a moving vehicle, a winding drum adapted to have a cable wound thereon, a fluid motor for driving said drum in a direction to wind cable thereon, a fluid pump and a pressure line connecting said pump to said motor, said motor being driven by said winding drum as a pump during the unwinding operation and effecting tension on said cable during unwinding and when unwinding ceases, and means for relieving pressure from said motor when driven as a pump, but permitting said pump to maintain a back pressure on said motor sufficient to maintain tension on said cable during the unwinding operation, including a relief valve connected to said pressure line, and a release valve operated by torque from said motor, to by-pass fluid passing said relief valve when said motor is operating as a pump.

21. In a cable reeling mechanism, a cable reel, a motor for driving said reel in cable winding direction, the pull of the cable off the reel effecting reel rotation in a direction to drive said motor backwards, and means including an element having limited movement and frictionally actuated by the reel as it turns in unwinding direction and held in one of its limit positions by forces transmitted from the reel for automatically reducing the motor torque when cable is pulled off of the reel, to reduce the tension on the cable.

22. In a cable reeling mechanism, a cable reel, a fluid operated motor for driving said reel in cable winding direction, the pull of the cable off from the reel effecting reel rotation in a direction to drive said motor backwards, and means frictionally actuated and yieldingly held by said reel as it turns in cable unwinding direction for automatically reducing the back pressure on said motor when cable is pulled off of the reel, to reduce the resistance to reel-rotation.

23. In a cable reeling mechanism, a cable reel, a fluid operated motor adapted to drive said reel only in a direction to wind in the cable, said reel as it rotates in cable unwinding direction under the pull of the cable effecting drive of said motor in a reverse direction so that said motor acts as a brake, and means for automatically reducing the resistance to reel rotation afforded by the motor as it is driven backwards, to reduce the tension on the cable, said resistance reducing means including a valve and a swingable valve actuating element having limited movement and mechanically shifted to and held in one of its limit positions by the reel as the latter is rotated in cable unwinding direction.

24. In a cable reeling mechanism, a cable reel, a fluid motor for driving the reel in only cable winding direction, the pull of the cable off the reel effecting reel rotation in a direction to drive said motor backwards, a fluid reservoir, a fluid pump having its intake connected to said reservoir for supplying fluid under pressure to said motor, and means, including a valve mechanically actuated by said reel as the latter turns in cable unwinding direction and having associated therewith means for precluding the exertion thereon in a direction to affect actuation thereof of any fluid pressure of consequence, for automatically reducing the pressure acting on the motor by releasing back to the fluid reservoir, at a pressure lower than the pressure supplied to the motor when the latter drives the reel, fluid discharged from the pump.

25. In a cable reeling mechanism, a cable reel, a fluid motor for driving the reel in cable winding direction only, the pull of the cable off the reel effecting reel rotation in a direction to drive said motor backwards, a fluid reservoir, a fluid pump having its intake connected to said reservoir for supplying fluid under pressure to said motor, a conduit connecting the discharge of said pump with said motor for delivering operating fluid to the latter, a continuously freely open conduit for conducting back to the reservoir fluid discharged from said motor after it has done work therein and for supplynig fluid to said motor from said reservoir when the motor is driven backward, and means for automatically reducing the pressure to which the motor is subjected when driven backward including means forming a discharge line leading to the fluid reservoir from a point between the discharge of said pump and said motor, a valve controlling flow through said discharge line and means mechanically actuated by said reel as the latter turns in cable unwinding direction for moving said valve to open position.

CHARLES F. BALL.

References Cited in the file of this patent

UNITED STATES PATENTS

| Number | Name | Date |
|---|---|---|
| 1,206,309 | Davis | Nov. 28, 1916 |
| 2,090,707 | Sloane | Aug. 24, 1937 |
| 2,395,302 | Slomer | Feb. 19, 1946 |